United States Patent [19]
Aoshima

[11] Patent Number: 5,973,425
[45] Date of Patent: Oct. 26, 1999

[54] MOTOR

[75] Inventor: Chikara Aoshima, Zama, Japan

[73] Assignee: Canon Kabushiki Kaisha, Tokyo, Japan

[21] Appl. No.: 09/022,474

[22] Filed: Feb. 12, 1998

[30] Foreign Application Priority Data

Feb. 14, 1997 [JP] Japan .................................. 9-047156
Mar. 26, 1997 [JP] Japan .................................. 9-091445

[51] Int. Cl.$^6$ .................................................. H02K 37/00
[52] U.S. Cl. ................................ 310/49 R; 310/40 MM
[58] Field of Search .............................. 310/49 R, 156, 310/114, 51, 164, 40 MM, 257

[56] References Cited

U.S. PATENT DOCUMENTS

| | | | |
|---|---|---|---|
| 2,916,642 | 12/1959 | Macks | 310/90 |
| 4,296,341 | 10/1981 | Guttinger | 310/4 |
| 4,823,038 | 4/1989 | Mizutani et al. | 310/257 |
| 4,987,329 | 1/1991 | Schmidt et al. | 310/156 |
| 5,028,827 | 7/1991 | Mosslacher | 310/83 |
| 5,384,506 | 1/1995 | Aoshima | 310/49 |
| 5,410,200 | 4/1995 | Sakamoto et al. | 310/49 R |
| 5,628,047 | 5/1997 | Hiroyoshi | 419/62 |
| 5,734,210 | 3/1998 | Keutz | 310/49 R |

FOREIGN PATENT DOCUMENTS

| | | |
|---|---|---|
| 410 488 A1 | 1/1991 | European Pat. Off. . |
| 725 262 A2 | 8/1996 | European Pat. Off. . |
| 801 459 A1 | 10/1997 | European Pat. Off. . |
| 09289767 | 11/1997 | Japan . |
| 1 357 269 | 6/1974 | United Kingdom . |

OTHER PUBLICATIONS

Patent Abstracts of Japan, vol. II, No. 374, published Dec. 5, 1987, English Abstract of Japanese Patent No. 62–141955.

Patent Abstracts of Japan, vol. 13, No. 344, published Aug. 3, 1989, English Abstract of Japanese Patent No. 01–103151.

*Primary Examiner*—Nestor Ramirez
*Assistant Examiner*—Joseph Waks
*Attorney, Agent, or Firm*—Fitzpatrick, Cella, Harper & Scinto

[57] ABSTRACT

A motor includes a rotor having a permanent magnet circumferentially equally divided and alternately magnetized to different poles formed into a cylindrical shape, and a first coil. The rotor and a second coil may be successively disposed axially of the rotor. A first outer magnetic pole and a first inner magnetic pole excited by the first coil may be opposed to the outer peripheral surface and the inner peripheral surface of the rotor, and a second outer magnetic pole and a second inner magnetic pole excited by the second coil may be opposed to the outer peripheral surface and the inner peripheral surface of the rotor. The rotor has an output transmitter, such as a gear or a pulley, mounted on the outer peripheral surface of the central portion thereof.

16 Claims, 12 Drawing Sheets

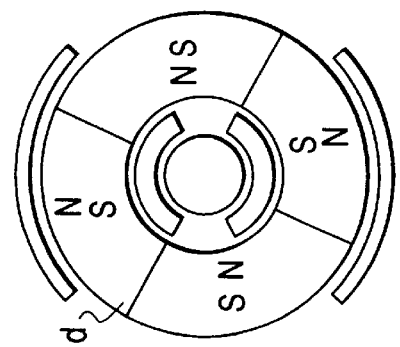
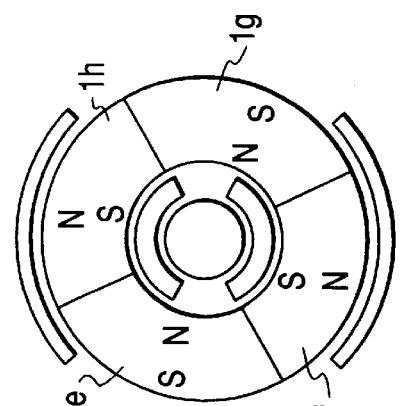
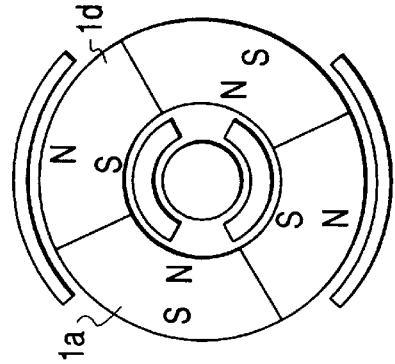
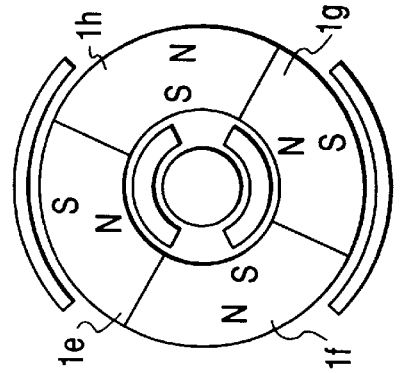
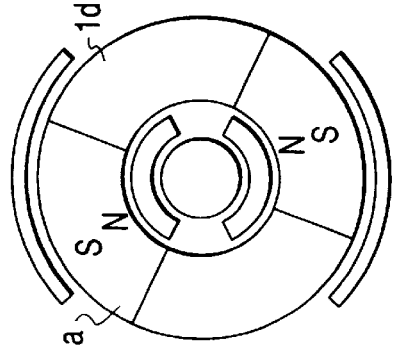
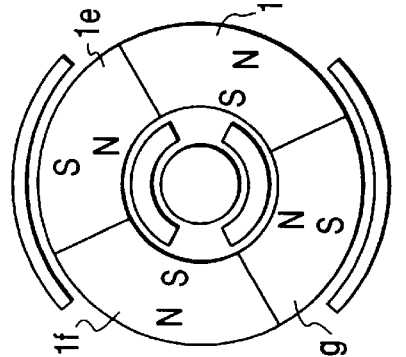
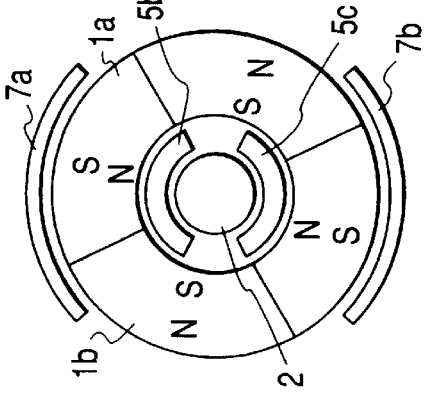
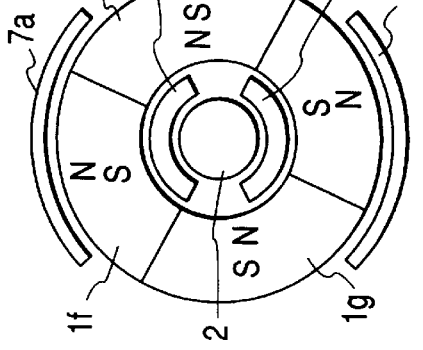

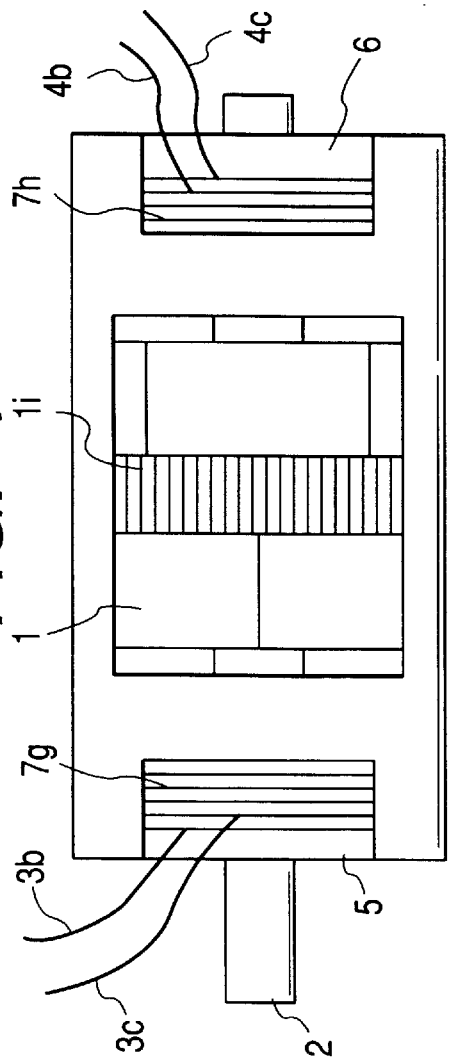
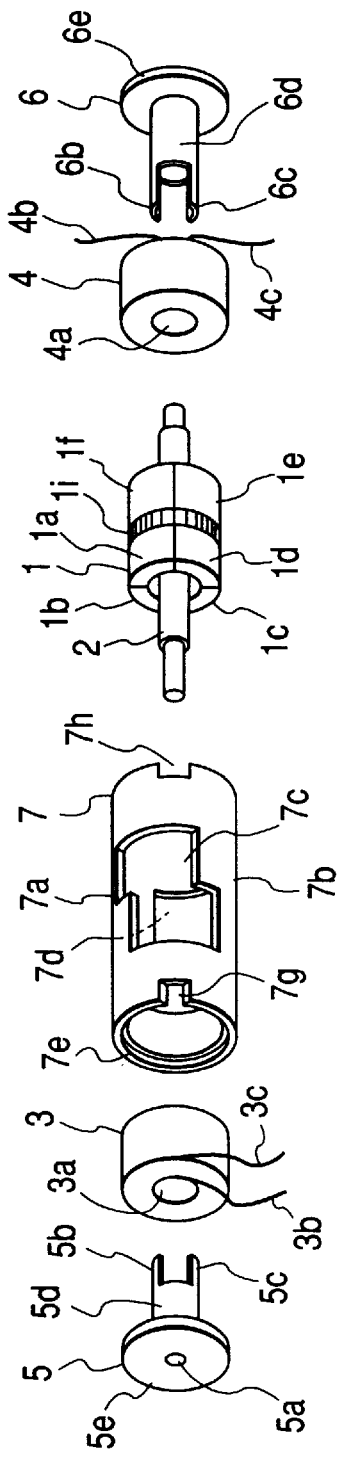

MOTOR

BACKGROUND OF THE INVENTION

1. Field of the Invention

This invention relates to a motor provided with output transmitting means on a rotor which can be constructed super-compactly.

2. Related Background Art

What are formed as compact motors include, for example, what is shown in FIG. 23 of the accompanying drawings as a compact cylinder type step motor. A stator coil 105 is wound on a bobbin 101 concentrically therewith, the bobbin 101 is sandwiched and fixed between two stator yokes 106 from the axial direction thereof and stator teeth 106a and stator teeth 106b are alternately disposed on the stator yokes 106 in the circumferential direction of the inner diametral surface of the bobbin 101, and the stator yokes 106 integral with the stator teeth 106a or 106b are fixed to cases 103, whereby a stator 102 is constructed.

A flange 115 and a bearing 108 are fixed to one of two sets of cases 103, and another bearing 108 is fixed to the other case 103. A rotor 109 comprises a rotor magnet 111 fixed to a rotor shaft 110, and the rotor magnet 111 formes a radial clearance portion with the stator yokes 106 of the stator 102. The rotor shaft 110 is rotatably supported between two bearings 108.

However, the above-described compact step motor according to the prior art has the cases 103, the bobbin 101, the stator coil 105 and the stator yokes 106 concentrically disposed on the outer periphery of the rotor and therefore has the disadvantage that the outer dimension of the motor becomes large. Also, the magnetic flux created by the supply of electric power to the stator coil 105 passes chiefly the end surface 106a1 of the stator teeth 106a and the end surface 106b1 of the stator teeth 106b as shown in FIG. 24 of the accompanying drawings and therefore does not effectively act on the rotor magnet 111, and this has led to the disadvantage that the output of the motor does not become high.

The applicant has previously proposed a motor which has solved such problems in U.S. patent application Ser. No. 08/831,863.

This proposed motor is constructed in such a manner that a rotor comprising a permanent magnet equally divided in the circumferential direction thereof and alternately magnetized to different poles is formed into a cylindrical shape, a first coil, the rotor and a second coil are successively disposed axially of the rotor, a first outer magnetic pole and a first inner magnetic pole excited by the first coil are opposed to the outer peripheral surface and the inner peripheral surface of the rotor, and a second outer magnetic pole and a second inner magnetic pole excited by the second coil are opposed to the outer peripheral surface and the inner peripheral surface of the rotor, and a rotary shaft, which is a rotor shaft, is taken out of the cylindrically shaped permanent magnet.

The motor of such construction can be made high in output and small in its outer dimension, but since the diametral dimension of the inner magnetic pole is small, it has been difficult to work the teeth of the magnetic pole, and since the rotary shaft taken out of the cylindrically shaped permanent magnet is also small, it has also been difficult to work the rotor provided with the rotary shaft.

Therefore, the applicant has recently proposed in U.S. patent application Ser. No. 08/994,994 a motor in which the shape of an inner magnetic pole is made into a shape of good workability (the applicant has also proposed in U.S. patent application the number of which is not yet assigned a motor in which a rotor provided with a rotary shaft has also been made easily workable), but there has been desired a rotor in which output transmitting means, such as a gear or a pulley can be easily mounted on a rotary shaft of a small diametral dimension and a stable output free of vibration can be obtained.

SUMMARY OF THE INVENTION

The present invention has been made in view of the above-noted circumstances and an object thereof is to provide a motor which can be constructed super-compactly so that the output of the motor can be easily taken out to the outside.

Another object of the present invention is to provide a motor which can be constructed super-compactly so that a stable output free from vibration can be obtained.

Other objects of the present invention will become apparent from the following detailed description of some specific embodiments of the invention.

BRIEF DESCRIPTION OF THE DRAWINGS

FIGS. 3A, 3B, 3C, 3D, 3E, 3F, 3G and 3H are illustrations of the rotating operation of the rotor of the motor shown in FIG. 2.

FIG. 4 is a side view of the motor shown in FIG. 2.

FIG. 5 is an exploded perspective view of a motor in which the rotor shown in FIG. 4 is of a single layer construction.

DESCRIPTION OF THE PREFERRED EMBODIMENTS

Figure 1:
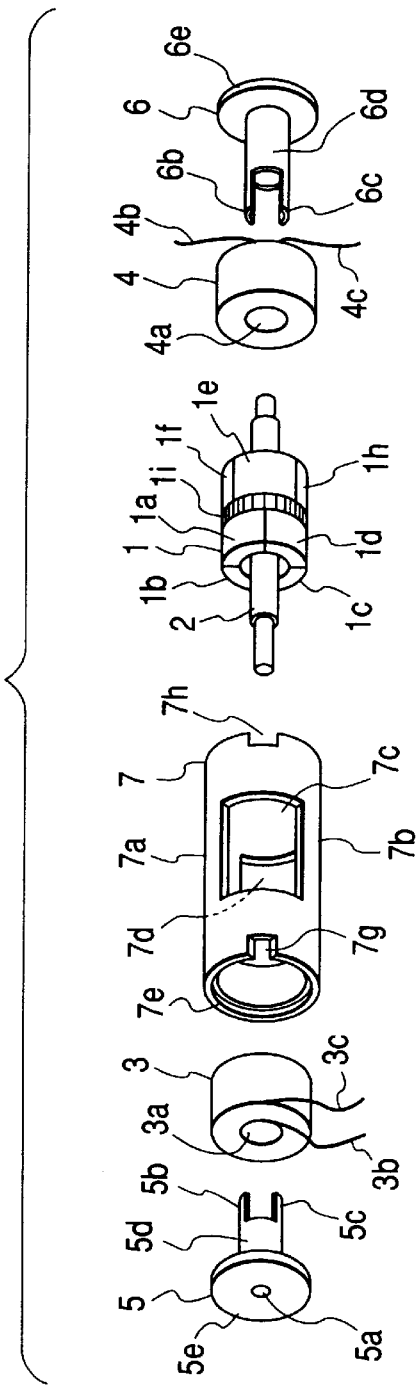
FIG. 1 is an exploded perspective view of a motor according to a first embodiment of the present invention.

Some embodiments of the present invention will hereinafter be described with reference to the drawings.
(Embodiment 1)

FIGS. 1 to 4 show Embodiment 1 of the present invention. The reference numeral 1 designates a magnet comprising a cylindrically shaped permanent magnet comprising a first magnetized layer having its circumference divided into n positions (in the present embodiment, four) and comprising portions 1a, 1b, 1c and 1d, having S poles and N poles alternately magnetized thereon, and a second magnetized layer having its circumference divided also into four positions and comprising portions 1e, 1f, 1g and 1h, having S poles and N poles alternately magnetized thereon. The first magnetized layer and the second magnetized layer are magnetized with their phases shifted by 180/n degrees, i.e., 45°, relative to each other. In the present embodiment, magnetization is effected so that the outer peripheral surfaces of the portions 1a and 1c of the first magnetized layer and the outer peripheral surfaces of the portions 1e and 1g of the second magnetized layer may become S poles and the inner peripheral surfaces thereof may become N poles and that the outer peripheral surfaces of the portions 1b and 1d of the first magnetized layer and the portions 1f and 1h of the second magnetized layer may become N poles and the inner peripheral surfaces thereof may become S poles. Power transmitting means comprising again 1i is integrally formed on the outer peripheral surface between the first magnetized layer and the second magnetized layer, i.e., at an approximately intermediate position with respect to the axial direction of the magnet 1. The power transmitting means may be, besides the gear, a pulley for transmitting power by friction. The magnet 1 comprises, for example, a plastic magnet.

The reference numeral 2 denotes a rotary shaft to which the magnet 1 is secured. The rotary shaft 2 and the magnet 1 together constitute a rotor. The reference numerals 3 and 4 designate first and second coils which are disposed concentrically with the magnet 1 and at positions axially sandwiching the magnet 1 therebetween. The reference characters 3b and 3c denote the terminal portions of the coil 3, and the reference characters 4b and 4c designate the terminal portions of the second coil 4. The reference numeral 5 denotes a first yoke formed of a soft magnetic material, and having a portion 5d inserted in the inner diametral portion 3a of the coil 3 and teeth 5b and 5c opposed to the inner diametral portion of the first magnetized layer of the magnet 1. The teeth 5b and 5c are formed with a deviation of 360/(n/2) degrees, i.e., 180°, so as to be of the same phase with respect to the poles of the first magnetized layer. The aperture 5a of the first yoke and the portion 2a of the rotary shaft 2 are rotatably fitted to each other.

The reference numeral 6 designates a second yoke, formed of a soft magnetic material, and having a portion 6d inserted in the inner diametral portion 4a of the second coil 4 and teeth 6b and 6c opposed to the inner diametral portion of the second magnetized layer of the magnet 1. The teeth 6b and 6c are formed with a deviation of 360/n(n/2) degrees, i.e., 180°, so as to be of the same phase with respect to the poles of the second magnetized layer. The aperture 6a of the second yoke 6 and the portion 2b of the rotary shaft 2 are rotatably fitted to each other.

The teeth 5b, 5c of the first yoke 5 and the teeth 6b, 6c of the second yoke 6 are of the same phase, i.e., at positions opposed to each other with respect to the axial direction. The reference numeral 7 denotes a third yoke formed of a soft magnetic material. The third yoke is of a cylindrical shape and is constructed so as to cover the first coil 3, the second coil 4 and the outer periphery of the magnet 1. The third yoke 7 is coupled to the portion 5e of the first yoke 5 at the portion 7e thereof, and is coupled to the portion 6e of the second yoke 6 at the portion 7f thereof as by welding, adhesion or press-in.

The terminal portions 3b and 3c of the first coil 3 are made to protrude from the cut-away portion 7g of the third yoke 7 when the first yoke 5 and the third yoke 7 are coupled together. Also, the terminal portions 4b and 4c of the second coil 4 are made to protrude from the cut-away portion 7h of the third yoke 7 when the second yoke 6 and the third yoke 7 are coupled together. If this is done, the assembling property will be very much improved as compared with a method of forming apertures in the yokes and passing the terminals of the coils into the apertures. Also, the third yoke 7 has portions 7a and 7b opposed to the teeth 5b, 5c of the first yoke 5 and the teeth 6b, 6c of the second yoke 6 with the magnet 1 interposed therebetween, and is formed with apertures 7c and 7d in the other portions thereof.

The portions 7a, 7b of the third yoke 7, which are opposed to the teeth 5b, 5c of the first yoke 5 with the magnet 1 interposed therebetween, together constitute a first outer magnetic pole portion, and the teeth 5b, 5c of the first yoke 5, which are opposed to the inner diametral portion of the magnet 1, together constitute a first inner magnetic pole portion. Also, the portions 7a, 7b of the third yoke 7, which are opposed to the teeth 6b, 6c of the second yoke 6 with the magnet 1 interposed therebetween, together constitute a second outer magnetic pole portion, and the teeth 6b, 6c of the second yoke 6, which are opposed to the inner diametral portion of the magnet 1, together constitute a second inner magnetic pole porion. Since the teeth 5b, 5c of the first yoke 5 and the teeth 6b, 6c of the second yoke 6 are of the same phase, the magnetic pole portions 7a, 7b of the third yoke 7 to be opposed to those teeth are of a simple shape as shown in FIG. 1, and become easy to manufacture by press or the like.

Figure 2:
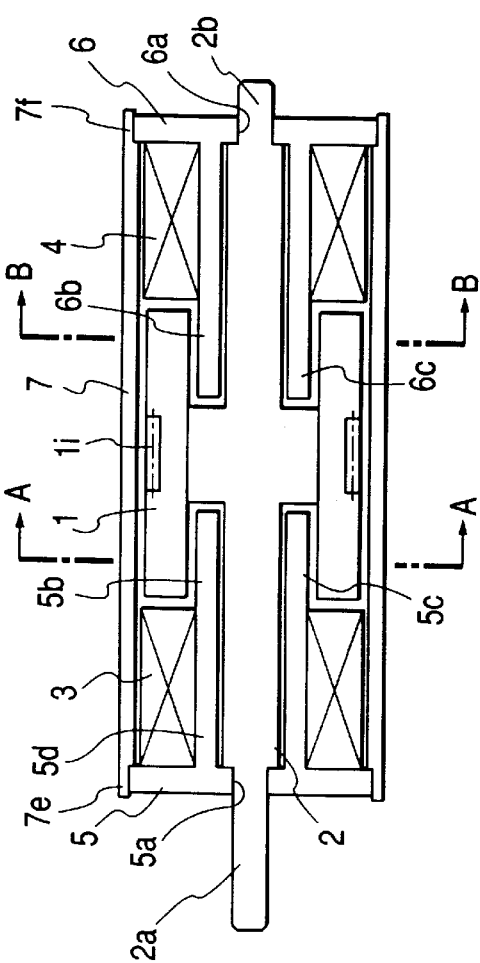
FIG. 2 is a cross-sectional view of the motor shown in FIG. 1 during the assembly thereof.
Figure 6:
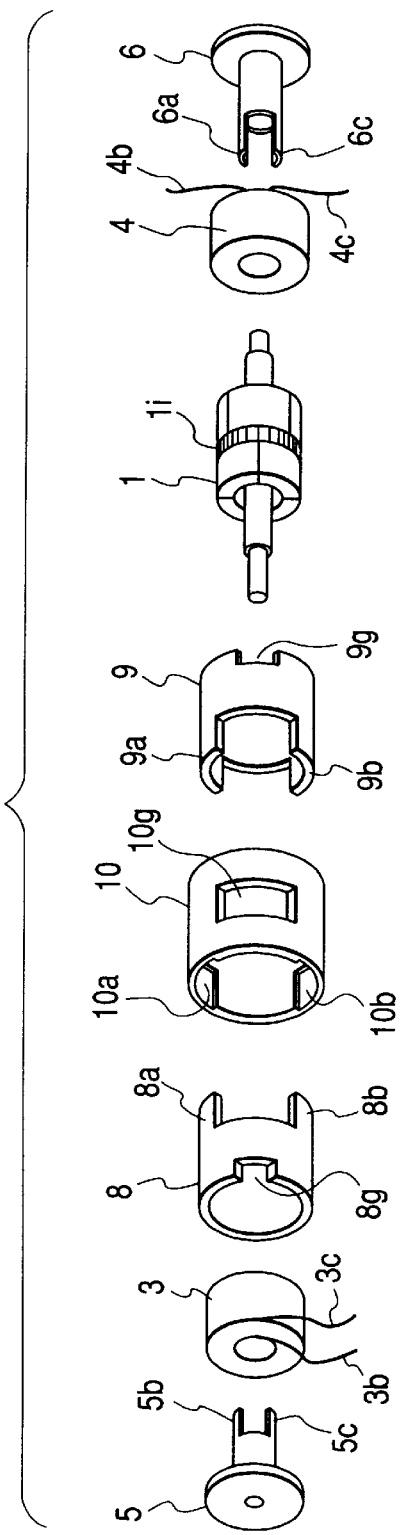
FIG. 6 is an exploded perspective view of a motor according to a second embodiment of the present invention.

FIG. 2 is a cross-sectional view after assembly, FIGS. 3A, 3B, 3C and 3D show cross-sections along the line A—A of FIG. 2, and FIGS. 3E, 3F, 3G and 3H show cross-sections along the line B—B of FIG. 2. FIGS. 3A and 3E are cross-sectional views at the same point of time, FIGS. 3B and 3F are cross-sectional views at the same point of time, FIGS. 3C and 3G are cross-sectional views at the same point of time, and FIGS. 3D and 3H are cross-sectional views at the same point of time.

When from the state of FIGS. 3A and 3E, the first coil 3 and the second coil 4 are electrically energized to thereby excite the teeth 5b, 5c of the first yoke 5 to the S poles, the portions 7a, 7b of the third yoke which are opposed to the teeth 5b, 5c to the N poles, the teeth 6b, 6c of the second yoke to the S poles, and the portions 7a, 7b of the third yoke which are opposed to the teeth 6b, 6c to the N poles, the magnet 1 is rotated leftwardly (counter-clockwisely) by 45° and assumes the state shown in FIGS. 3B and 3F.

Next, the supply of electric power to the first coil 3 is reversed to thereby excite the teeth 5b, 5c of the first yoke 5 to the N poles, the portions 7a, 7b of the third yoke, which are opposed to the teeth 5b, 5c to the S poles, the teeth 6b, 6c of the second yoke 6 to the S poles, and the portions 7a, 7b of the third yoke which are opposed to the teeth 6b, 6c to the N poles, whereupon the magnet 1 is further rotated leftwardly by 45° and assumes a state shown in FIGS. 3C and 3G.

Next, the supply of electric power to the second coil 4 is reversed to thereby excite the teeth 6b, 6c of the second yoke 6 to the N poles and the portions 7a, 7b of the third yoke which are opposed to the teeth 6b, 6c to the S poles, whereupon the magnet 1 is further rotated leftwardly by 45°. By the direction of the supply of electric power to the first coil 3 and the second coil 4 being sequentially changed over, the rotor comprising the magnet 1 and the rotary shaft 2 is rotated to a position conforming to the phase of the supply of electric power. FIG. 4 is a side view after assembly.

According to such a construction, the first coil 3 and the second coil 4 are disposed at locations sandwiching the magnet 1 therebetween with respect to the axial direction thereof and therefore, the magnet 1 or the first coil and the second coil do not protrude to thereby provide a large diameter and as a whole, the outer diametral dimension does not become large. Further, magnetic fluxes created between the first outer magnetic pole portion and the first inner magnetic pole porion all act on the magnet 1, and the magnetic fluxes created between the second outer magnetic pole portion and the second inner magnetic pole porion all act on the magnet 1. That is, the the magnetic fluxes created by the supply of electric power to the first coil 3 and the second coil 4 effectively act on the magnet 1 and the output of the motor is heightened.

The drive force of this motor is taken out by taking out the rotative drive force of the gear 1i formed on the magnet 1, as shown in FIG. 4, from the aperture 7c or 7d of the third yoke 7 by a gear or the like, not shown. According to this, the gear is formed integrally with the magnet 1 and therefore, it is not necessary to newly mount a discrete gear on the rotary shaft 2 and take out the drive force and therefore, the cost corresponding to that gear can be kept low and also, the gear 1i is twin-supported by the rotary shaft 2 and vibration becomes small when the drive force is transmitted, and corresponds to the intermediate portion of the magnet 1 itself in which the drive force is created and therefore, the torsion created in the magnet 1 and the rotary shaft 2 becomes small and the output can be stably taken out.

While in Embodiment 1, the teeth 5b, 5c of the first yoke 5 and the teeth 6b, 6c of the second yoke 6 are at positions opposed to each other, the teeth 5b, 5c of the first yoke 5 and the teeth 6b, 6c of the second yoke 6 may be disposed with a deviation of 180/n degrees, i.e., 45°, therebetween, and the phase difference between the first magnetized layer and the second magnetized layer of the magnet 1 may be 0° or 90°. In that case, as shown in FIG. 5, the portions 7a, 7b of the third yoke 7 which are the first outer magnetic pole portions are disposed at positions opposed to the first inner magnetic pole portions 5b, 5c, and the portions 7a, 7b, which are the second outer magnetic pole portions are disposed at positions, opposed to the second inner magnetic pole portions 6a, 6c.

(Embodiment 2)

FIGS. 6 to 8, 9A, 9B, 10A, 10B, 11A, 11B, 12A and 12B show a second embodiment of the present invention. The reference numeral 8 designates a first outer yoke formed of a soft magnetic material, and teeth 8a, 8b are formed at positions sandwiching the teeth 5b, 5c of the first yoke 5 and the first magnetized layer of the magnet 1 therebetween. The reference numeral 9 denotes a second outer yoke formed of a soft magnetic material, and teeth 9a, 9b are formed at positions sandwiching the teeth 6b, 6c of the second yoke 6 and the second magnetized layer of the magnet 1 therebetween. The reference numeral 10 designates a connecting ring formed of a non-magnetic material, and the teeth 8a, 8b of the first outer yoke 8 are fitted to the grooves 10a, 10b of the connecting ring 10, and the teeth 9a, 9b of the second outer yoke 9 are fitted to the grooves 10c, 10d of the connecting ring 10, and the first outer yoke 8 and the second outer yoke 9 are fixed by a conventional method, e.g. adhesive securing. The first outer yoke 8 and the second outer yoke 9 are fixed at a predetermined interval by the portions 10e, 10f of the connecting ring 10. Also, the teeth 8a, 8b of the first outer yoke 8 are disposed in face-to-face relationship with the teeth 9a, 9b of the second outer yoke 9. A portion of the gear 1i of the magnet 1 is exposed from a hole 10g in the connecting ring 10 so that the drive force of the motor may be taken out from there toward the outside.

Figure 7:
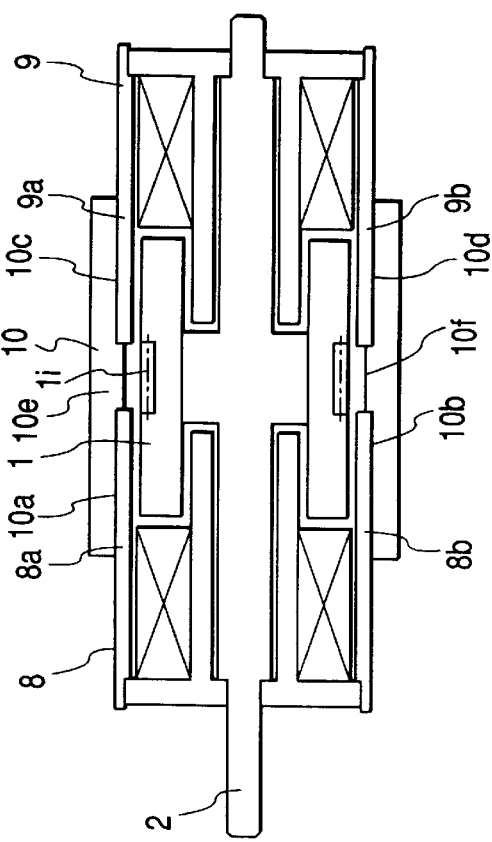
FIG. 7 is a cross-sectional view of the motor shown in FIG. 6 during the assembly thereof.

The first outer yoke 8 and the second outer yoke 9 perform a function similar to that of the third yoke 7 in Embodiment 1. Also, the first outer yoke 8, as shown in FIG. 7, has one end thereof connected to the first yoke 5 by a method such as welding, pressing-in or adhesively securing and covers the outer diametral portion of the first coil 3, and teeth 8a, 8b which are the outer end of the first outer yoke 8 are opposed to each other on the outer peripheral portion of the magnet 1 at a predetermined interval. The cut-away portion 8g of the first outer yoke 8 cooperates with the first yoke 5 to form a hole when it is connected to the first yoke 5. When the first outer yoke 8 and the first yoke 5 are connected together, the terminal portions 3b, 3c of the first coil 3 are made to protrude outwardly from the cut-away portion 8g of the first outer yoke 8. If this is done, the assembling property will be very much improved as compared with a method of forming a hole in the yoke and passing the terminal of a coil through that hole. The teeth 8a, 8b of the first outer yoke 8 together constitute a first outer magnetic pole portion.

The second outer yoke 9, as shown in FIG. 7, has one end thereof connected to the second yoke 6 by a method such as welding, pressing-in or adhesively securing and covers the outer diametral portion of the second coil 4, and teeth 9a, 9b, which are the other end of the second outer yoke 9, are opposed to the outer peripheral porion of the magnet 1 at a predetermined interval. The cut-away 9g of the second outer yoke 9, when connected to the second yoke 6, cooperates with the first yoke 6 to form a hole. When the second outer yoke 9 and the second yoke 6 are connected together, the terminal portions 4b, 4c of the second coil 4 are made to protrude outwardly from the cut-away porion 9g of the second outer yoke 9. If this is done, the assembling property will be very much improved as compared with a method of forming a hole in the yokes and passing the terminal of the coil through that hole. The teeth 9a, 9b of the second outer yoke 9 together constitute a second outer magnetic pole portion.

Figure 8:
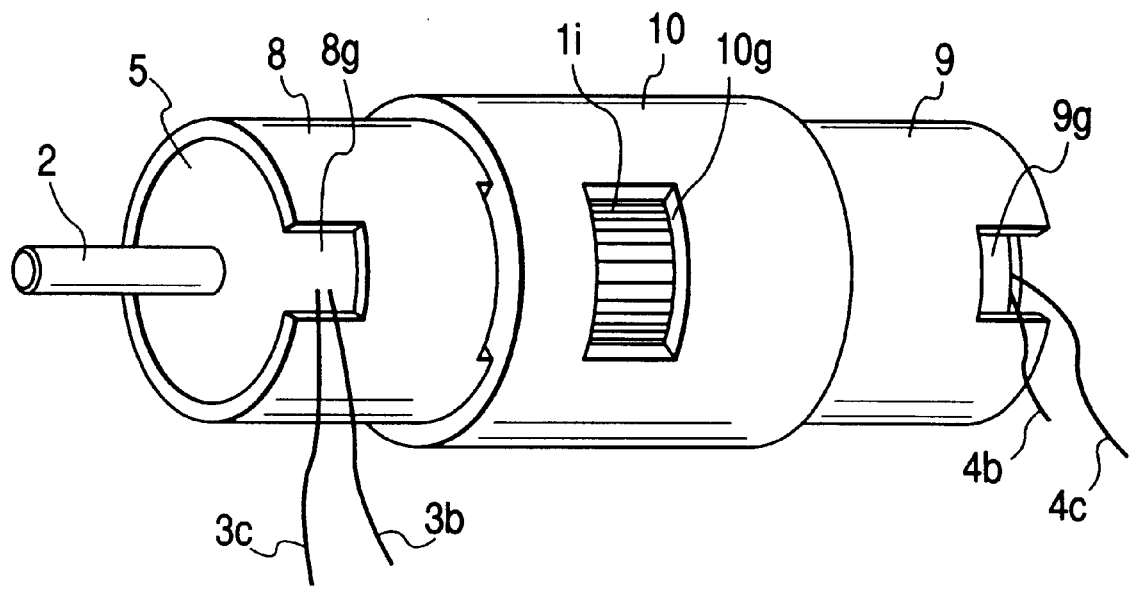
FIG. 8 is a perspective view of the motor shown in FIG. 7.
Figure 9A:
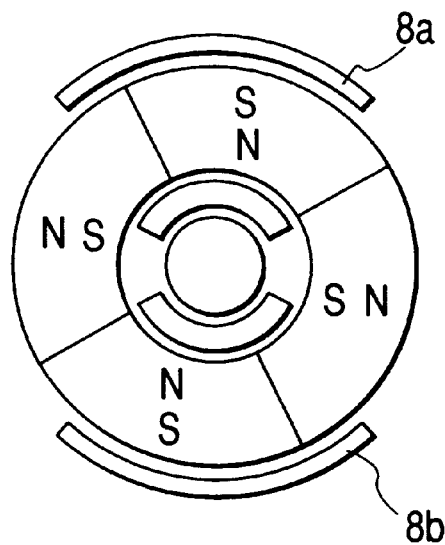
FIGS. 9A and 9B show a first state of a rotor relative to the yoke of the motor shown in FIG. 7.
Figure 9B:
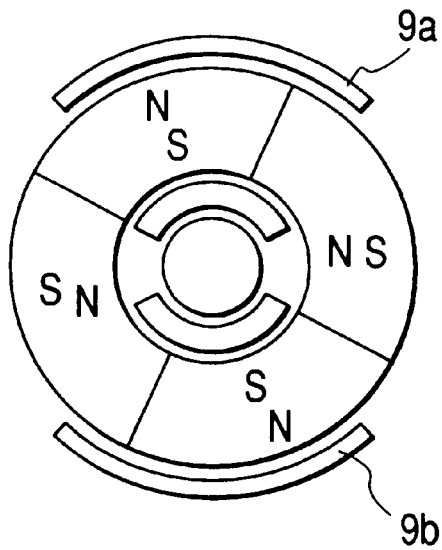
Figure 10A:
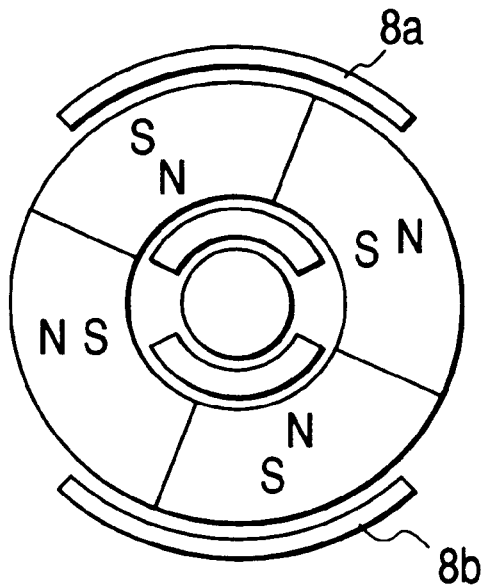
FIGS. 10A and 10B show a second state of the rotor shown in FIGS. 9A and 9B.
Figure 10B:
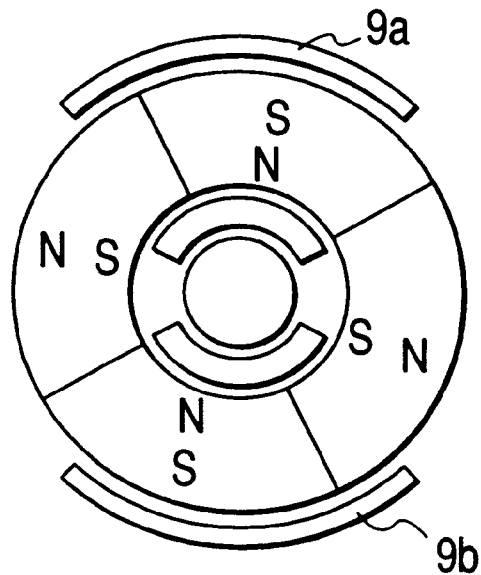
Figure 11A:
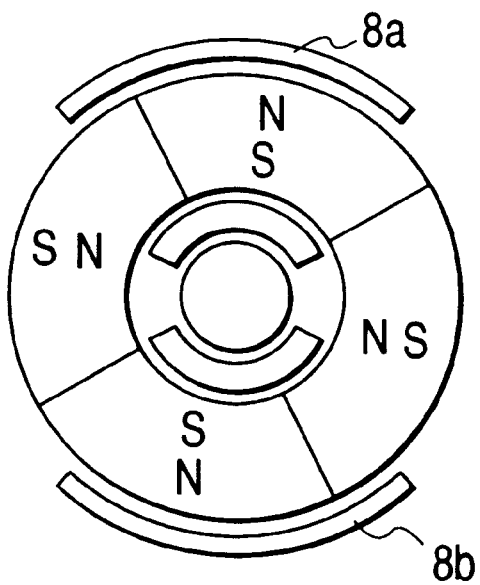
FIGS. 11A and 11B show a third state of the rotor shown in FIGS. 9A and 9B.
Figure 11B:
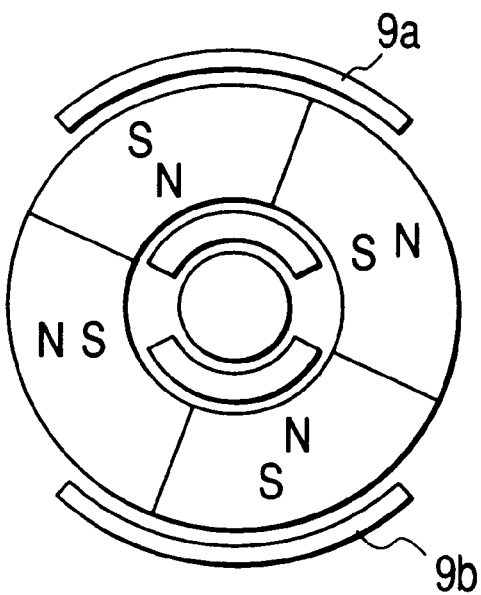
Figures 12A, 12B:
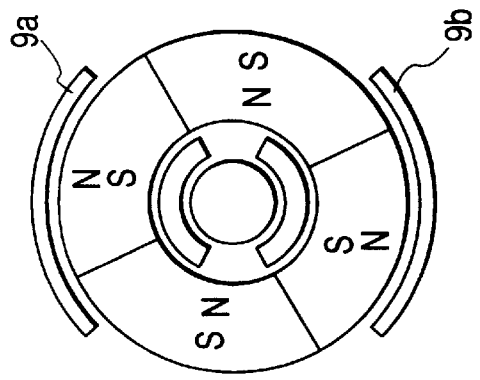
FIGS. 12A and 12B show a fourth state of the rotor shown in FIGS. 9A and 9B.
Figure 13:
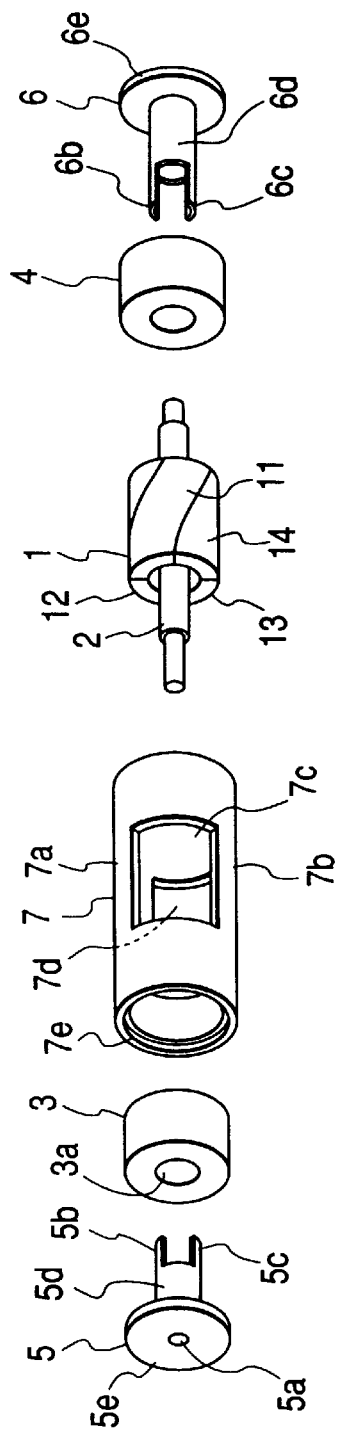
FIG. 13 is an exploded perspective view of a motor according to a third embodiment of the present invention.

FIG. 8 is a perspective view after assembly. FIGS. 9A and 9B through 12A and 12B show the rotation phases of the magnet 1, and FIGS. 9A, 10A, 11A and 12A show the first magnetized layer, and FIGS. 9B, 10B, 11B and 12B show the second magnetized layer. Assuming that as in Embodiment 1, the outer yokes are constituted by the integral third yoke 7, the going and coming of a magnetic flux will take place between the first magnetized layer and the second magnetized layer of the magnet 1 through the third yoke 1.

Therefore, at the rotated positions of the magnet 1 shown in FIGS. 9A, 9B, 11A and 11B, the force by cogging becomes stronger than in the cases shown in FIGS. 10A, 10B, 12A and 12B. These positions in which cogging is strong appear four times at a pitch of 90° during one full rotation. The present motor effects one full rotation by eight times when the supply of electric power to the coils 3 and 4 is sequentially alternated and therefore, the electromagnetic force created by the supply of electric power to the first coil 3 and the second coil 4 and the force by cogging do not always coincide with each other. Therefore, the fluctuation of the created drive force is great and rotation does not become smooth.

In the present embodiment, the first outer yoke 8 and the second outer yoke 9 are magnetically separated from each other by the connecting ring 10 formed of a non-magnetic material and therefore, the going and coming of a magnetic flux between the first magnetized layer and the second magnetized layer through the first outer yoke 8 and the second outer yoke 9 hardly take place and cogging occurs is four times at a pitch of 90° by the first magnetized layer, and four times at a pitch of 90° by the second magnetized layer which is 45° out of phase therewith, thus eight times in total. Also, the frequency of the occurrence is at a pitch of 45° and therefore, there is provided a motor in which the fluctuation of the created drive force is small and of which the rotation is smooth.

While the holes through which the terminals 3b, 3c of the first coil 3 and the terminals 4b, 4c of the second coil 4 protrude are formed by the cut-away portion 8g of the first outer yoke 8 and the cut-away portion 9g of the second outer yoke 9, cut-away portions may be formed on the first yoke 5 and the second yoke 6 side as in the aforedescribed Embodiment 1 and the holes may be formed by those cut-away portions being connected to the first outer yoke 8 and the second outer yoke 9.

According to such a construction, the first coil 3 and the second coil 4 are disposed at locations sandwiching the magnet 1 with respect to the axial direction thereof and therefore, the magnet 1 or the first coil and the second coil do not protrude to thereby provide a large diameter, but as a whole, the outer diametral dimension does not become large. Further, the magnetic fluxes created between the first outer magnetic pole portion and the inner magnetic pole portion all act on the magnet 1, and the magnetic fluxes created between the second outer magnetic pole portion and the second inner magnetic pole portion all act on the magnet 1. That is, the magnetic fluxes created by the supply of electric power to the first coil 3 and the second coil 4 effectively act on the magnet 1 and the output of the motor is heightened.

The drive force of the present motor is taken out to the outside by taking out the rotatively driving force of the gear li formed on the magnet 1 from the hole 10g in the connecting ring 10 of the third yoke 7 by a gear or the like, not shown, as previously described. According to this, the gear is formed integrally with the magnet 1 and therefore, it is not necessary to newly mount a discrete gear on the rotary shaft 2 and take out the drive force and thus, the cost corresponding to the gear is kept low and the gear li is twin-supported by the rotary shaft 2 and vibration becomes null when the drive force is transmitted, and corresponds to the intermediate portion of the magnet 1 itself in which the drive force is created and therefore, the torsion created in the magnet 1 and the rotary shaft 2 becomes small and the output can be stably taken out. Also, of course, the first yoke 5 and the first outer yoke 8, and the second yoke 6 and the second outer yoke 9 may be constructed integrally with each other, respectively.

Further, while in the present embodiment, the teeth 5b, 5c of the first yoke 5 and the teeth 6b, 6c of the second yoke 6 are at positions facing each other, the teeth 5b, 5c of the first yoke 5 and the teeth 6b, 6c of the second yoke 6 may be disposed with a deviation of 180/n degrees, i.e., 45°, therebetween as in FIG. 5, and the phase difference between the first magnetized layer and the second magnetized layer of the magnet 1 may be 0° or 90°. In that case, the portions 8a, 8b, which are the first outer magnetic pole portions of the first outer yoke 8, are disposed at positions opposed to the first inner magnetic pole portions 5b, 5c, and the portions 9a, 9b, which are the second outer magnetic pole portions of the second outer yoke 9 are disposed at positions opposed to the second inner magnetic pole portions 6b, 6c.

As described above, according to the present invention, the first coil and the second coil are disposed at locations sandwiching the magnet with respect to the axial direction thereof and therefore, the first coil, the second coil and the magnet do not protrude and become large, thus making the outer diametral dimension of the present motor small. Also, the magnetic fluxes created between the first outer magnetic pole portion and the first inner magnetic pole portion all act on the magnet, and the magnetic fluxes created between the second outer magnetic pole portion and the second inner magnetic pole portion all act on the magnet. That is, the magnetic fluxes created by second coil effectively act on the magnet and therefore, the output of the motor is heightened. Also, the power transmitting means formed on the outer peripheral surface of the axially central portion of the magnet eliminates the necessity of newly mounting power transmitting means, such as a gear or a pulley, on the output shaft, and this contributes to a reduction in cost and also, the drive force corresponds to the created center of the magnet and therefore, vibration is small and the output can be stably transmitted.

(Embodiment 3)

FIGS. 13 to 16 show Embodiment 3 of the present invention, and in this Embodiment 3, the magnetization of the magnet constituting the rotor is made spiral to facilitate the magnetization, and the power transmitting means formed on the outer peripheral surface of the central portion of the magnet is not shown.

The reference numeral 1 designates a cylindrically shaped magnet ring comprising a permanent magnet of which the circumference is divided into n. In the present embodiment, it is divided into four portions and S poles and N poles are alternately magnetized thereon. The shape of magnetization is such a spiral shape that the magnet ring deviates by 180°/n (in the present embodiment, 45°) from one end surface thereof to the other end surface thereof. Portions $1_1$ and $1_3$ are magnetized so that the outer peripheral surfaces thereof may become S poles and the inner peripheral surfaces thereof may become N poles, and portions $1_2$ and $1_4$ are magnetized so that the outer peripheral surfaces thereof may become N poles and the inner peripheral surfaces thereof may become S poles.

The reference numeral 2 denotes a rotary shaft to which the magnet ring 1 is secured. The rotary shaft 2 and the magnet ring 1 together constitute a rotor. The reference numerals 3 and 4 designate coils which are concentric with the magnet ring 1 and the disposed at locations axially sandwiching the magnet ring 1 therebetween. The reference numeral 5 denotes a first yoke formed of a soft magnetic material and having a portion 5d inserted in the inner diametral portion 3a of the coil 3, and teeth 5b, 5c opposed to the inner diametral porion of a first magnetized layer of the permanent magnet 1. The teeth 5b, 5c are formed with a deviation of 360/(n/2) degrees, i.e., 180° so as to be of the same phase with respect to the pole of the first magnetized layer, and an aperture 5a in the first yoke and the portion 2a of the rotary shaft 2 are rotatably fitted to each other.

The reference numeral 6 denotes a second yoke formed of a soft magnetic material and having a portion 6d inserted in the inner diametral portion 4a of the coil 4 and teeth 6b, 6c opposed to the inner diametral portion of a second magnetized layer of the magnet ring 1. The teeth 6b, 6c are formed with a deviation of 360 (n/2) degrees, i.e., 180°, so as to be of the same phase with respect to the pole of the second magnetized layer. An aperture 6a in the second yoke 6 and the portion 2b of the rotary shaft 2 are rotatably fitted to each other. The teeth 5b, 5c of the first yoke 5 and the teeth 6b, 6c of the second yoke 6 are at positions of the same phase, i.e., opposed to each other with respect to the axial direction.

The reference numeral 7 designates a third yoke formed of a soft magnetic material. The third yoke 7 is of a cylindrical shape and is constructed so as to cover the coil 3, the coil 4 and the outer periphery of the magnet ring 1. The third yoke 7 is coupled to the portion 5e of the first yoke 5 at the portion 7e thereof, and is coupled to the portion 6e of the second yoke 6 at the portion 7f thereof. Also, the third yoke 7 has portions 7a and 7b opposed to the teeth 5b, 5c of the first yoke 5 and the teeth 6b, 6c of the second yoke 6 with the magnet ring 1 interposed therebetween, and the other portions of the third yoke 7 are formed with apertures 7c, 7d. Since the teeth 5b, 5c of the first yoke 5 and the teeth 6b, 6c of the second yoke 6 are of the same phase, the magnetic pole portions 7a, 7b of the third yoke 7 to be opposed to those teeth are of a simple shape as shown in FIG. 1 and become easy to manufacture as by press.

Figure 14:
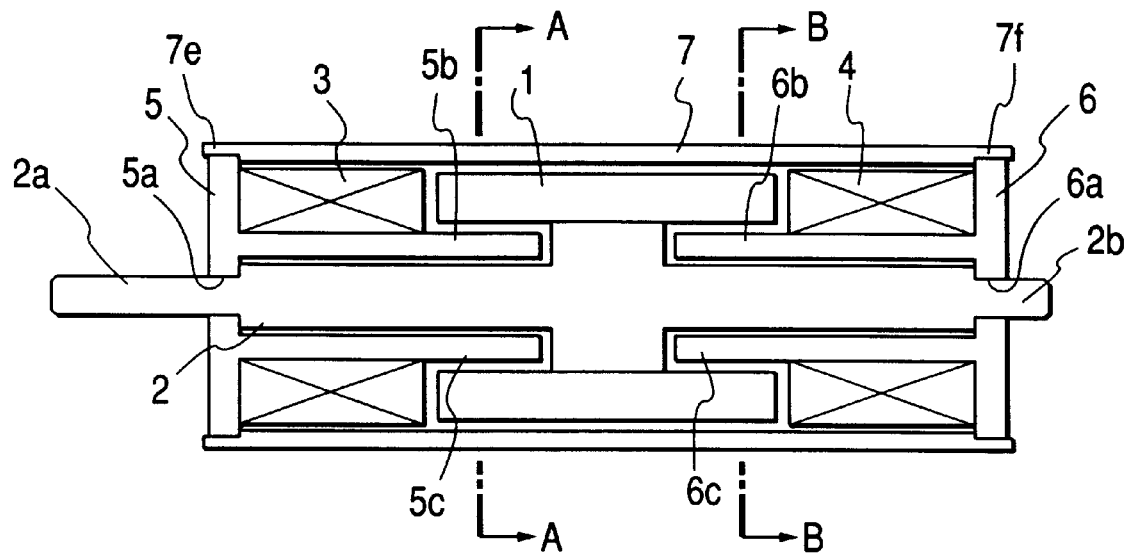
FIG. 14 is a cross-sectional view of the motor shown in FIG. 13 during the assembly thereof.

FIG. 14 is a cross-sectional view after assembly, and the rotating movement of this motor will now be described with reference to FIGS. 3A to 3H of Embodiment 1. FIGS. 3A, 3B, 3C and 3D show a cross-section along the line A—A of FIG. 14, and FIGS. 3E, 3F, 3G and 3H show a cross-section along the line B—B of FIG. 14.

From the state of FIGS. 3A and 3E, electric power is supplied to the coils 3 and 4 to thereby excite the teeth 5b, 5c of the first yoke 5 to the S poles, the portions 7a, 7b of the third yoke 7 which are opposed to the teeth 5b, 5c to the N poles, the teeth 6b, 6c of the second yoke 6 to the S poles, and the portions 7a, 7b of the third yoke which are opposed to the teeth 6b, 6c to the N poles, whereupon the magnet ring 1 is rotated by 45° leftwardly (counter-clockwisely) and assumes a state shown in FIGS. 3B and 3F.

Next, the supply of electric power to the coil 3 is reversed to thereby excite the teeth 5b, 5c of the first yoke 5 to the N poles, the portions 7a, 7b of the third yoke 7, which are opposed to the teeth 5b, 5c to the S poles, the teeth 6b, 6c of the second yoke 6 to the S poles, and the portions 7a, 7b of the third yoke 7, which are opposed to the teeth 6b, 6c to the N poles, whereupon the magnet ring 1 is further rotated by 45° leftwardly and assumes a state shown in FIGS. 3C and 3G.

Next, the supply of electric power to the coil 4 is reversed to thereby excite the teeth 6b, 6c of the second yoke 6 to the N poles, and the portions 7a, 7b of the third yoke 7, which are opposed to the teeth 6b, 6c to the S poles, whereupon the magnet ring 1 is further rotated by 45° leftwardly. By the direction of the supply of electric power to the coils 3 and 4 being thus sequentially changed over, the rotor comprising the magnet ring 1 and the rotary shaft 2 is rotated to a position conforming to the phase of the supply of electric power.

Figure 15:
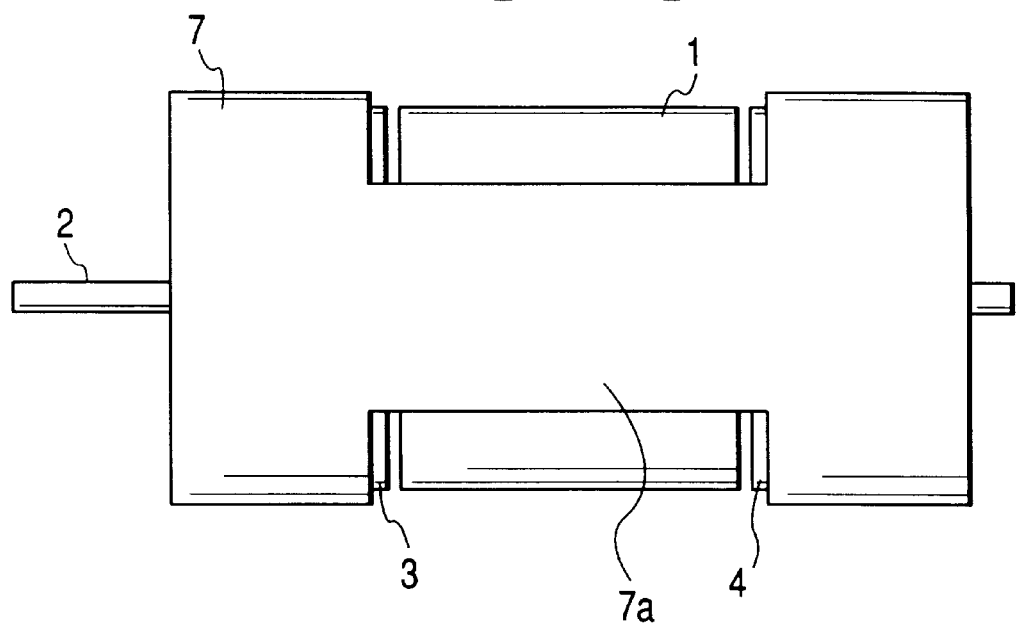
FIG. 15 is a plan view of the motor shown in FIG. 14.
Figure 16:
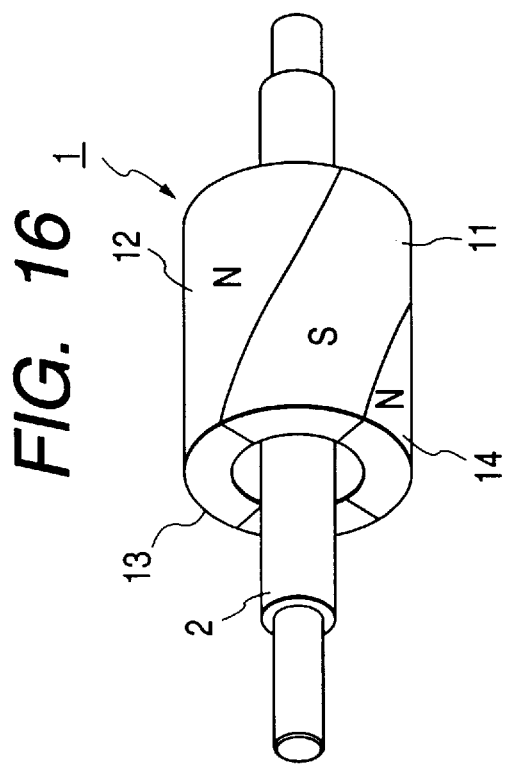
FIG. 16 is an enlarged view of the rotor shown in FIG. 14.
Figure 17:
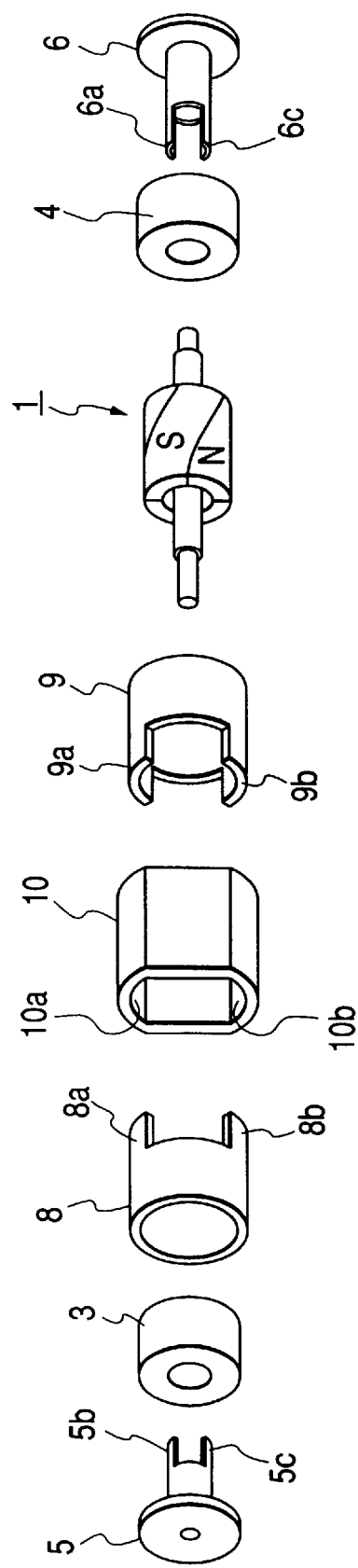
FIG. 17 is an exploded perspective view of a motor according to a fourth embodiment of the present invention.

FIG. 15 is a top plan view of the present motor. FIG. 16 is an enlarged view of the rotor. The magnetization shape of the magnet ring is a simple spiral shape as shown in FIG. 16 and therefore, magnetization is easy. The shape of the third yoke is simplified, and yet the magnetization of the magnet ring is made into an easily possible magnetization shape to thereby make the manufacture of the present motor easy.
(Embodiment 4)

FIGS. 17 to 21 show Embodiment 4 of the present invention. This Embodiment 4 is such that the magnetization of a magnet constituting a rotor is made into a spiral shape to make the magnetization easy, and power transmitting means formed on the outer peripheral surface of the central portion of the magnet is not shown.

The reference numeral 8 designates a first outer yoke formed of a soft magnetic material, and teeth 8a, 8b are formed at locations sandwiching the teeth 5b, 5c of the first yoke 5 and the first magnetized layer of the permanent magnet 1 therebetween. The reference numeral 9 denotes a second outer yoke formed of a soft magnetic material, and teeth 9a, 9b are formed at locations sandwiching the teeth 6a, 6c of the second yoke 6 and the second magnetized layer of the permanent magnet 1 therebetween. The reference numeral 10 designates a connecting ring formed of a non-magnetic material, and arcuate inner diameters 10a, 10b, the teeth 8a, 8b of the first outer yoke 8 and the teeth 9a, 9b of the second outer yoke 9 are fitted to one another, and the first outer yoke 8 and the second outer yoke 9 are fixed by a conventional method, e.g. adhesively securing or the like. The first outer yoke 8 and the second outer yoke 9 are fixed at a predetermined interval. Also, the teeth 8a, 8b of the first outer yoke 8 are disposed in face-to-face relationship with the teeth 9a, 9b of the second outer yoke 9. The first outer yoke 8 and the second outer yoke 9 together perform a function similar to that of the third yoke in Embodiment 1.

Figure 18:
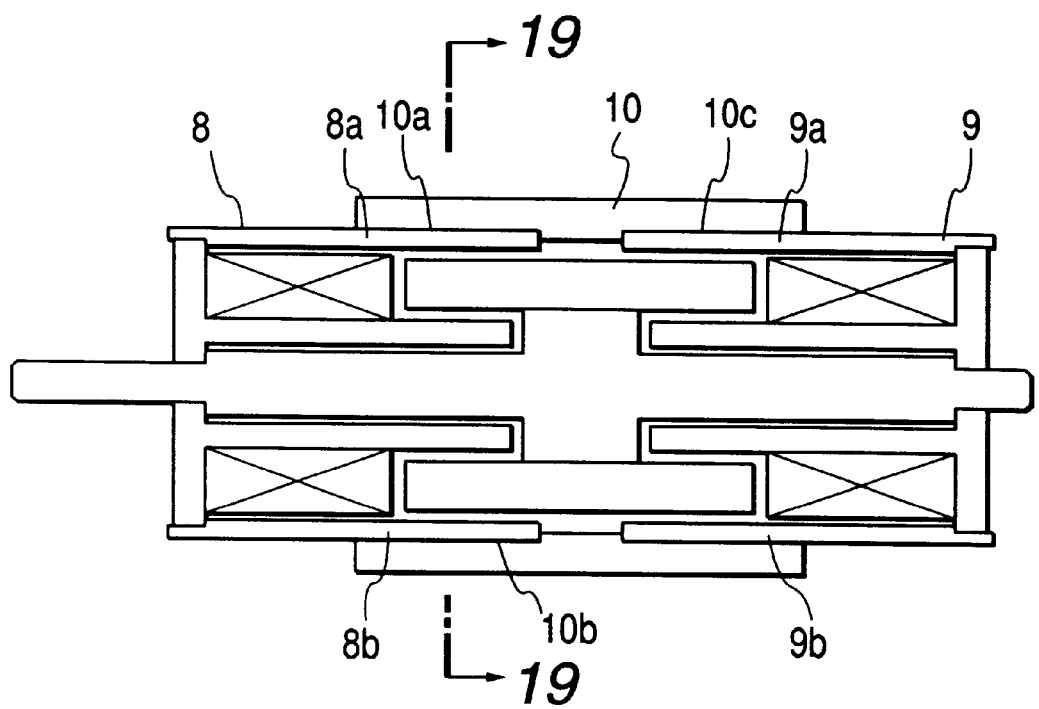
FIG. 18 is a cross-sectional view of the motor shown in FIG. 17 during the assembly thereof.

Also, the first outer yoke 8, as shown in FIG. 18, has one end thereof connected to the first yoke 5 and covers the outer diametral portion of the coil 3, and teeth 8a, 8b, which are the other end of the first outer yoke, are opposed to the outer peripheral portion of the permanent magnet 1 with a predetermined gap therebetween in a predetermined angle range. The second outer yoke 9, as shown in FIG. 18, has one end thereof connected to the second yoke 6 and covers the outer diametral portion of the coil 4, and teeth 9a, 9b, which are the other end of the second outer yoke, are opposed to the outer peripheral portion of the permanent magnet 1 with a predetermined gap therebetween in a predetermined angle range. The first outer yoke 8 and the second outer yoke 9 are magnetically separate from each other and therefore, a magnetic flux created by the coil 3 does not pass through the second outer yoke and act on the coil 4, and a magnetic flux created from the coil 4 does not pass through the first outer yoke and act on the coil 3, and the output becomes higher than in Embodiment 3.

Figure 19:
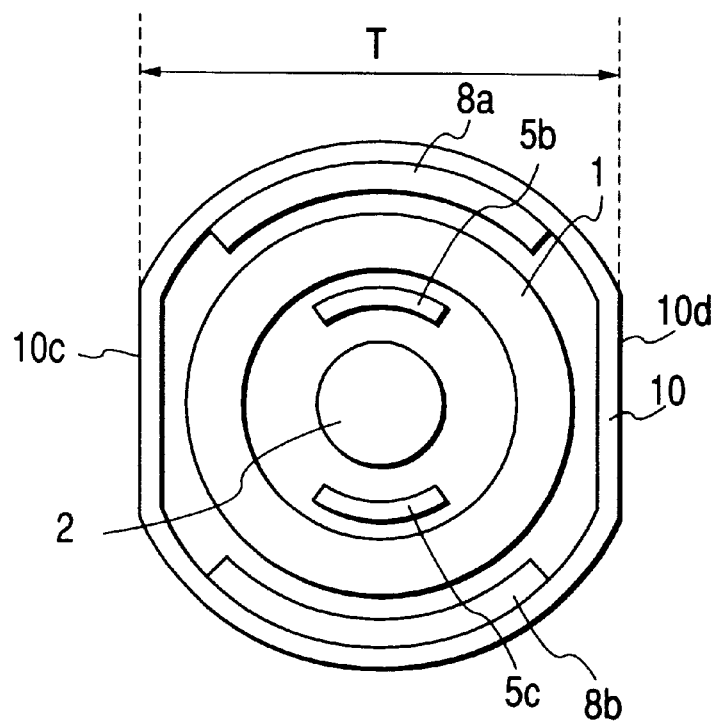
FIG. 19 is a cross-sectional view of the motor shown in FIG. 18 taken along the line 19—19 of FIG. 18.

The magnetization shape of the magnet ring 1 is a simple spiral shape as shown in FIG. 16 and therefore, magnetization is easy and the connecting ring 10 is also simple in shape. Further, as shown in FIG. 19 which is a cross sectional view taken along the line 19—19 of FIG. 18, in the connecting ring 10, the portions thereof which are free of the teeth 8a, 8b of the first outer yoke 8 and the teeth 9a, 9b of the second outer yoke 9 can be made into parallel surfaces 10c, 10d and therefore, the thickness T of the motor can be made small. Also, the magnetization of the magnet ring 1 is effected so that different poles may be provided on the outer peripheral surface and the inner peripheral surface, but driving is possible even if only the outer peripheral surface is magnetized.

Figure 20:
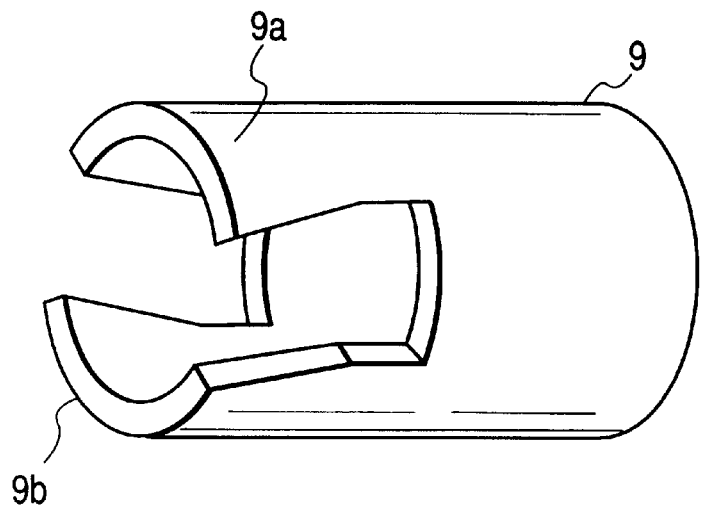
FIG. 20 shows the outer yoke of the motor shown in FIG. 18 as it is made spiral.
Figure 21:
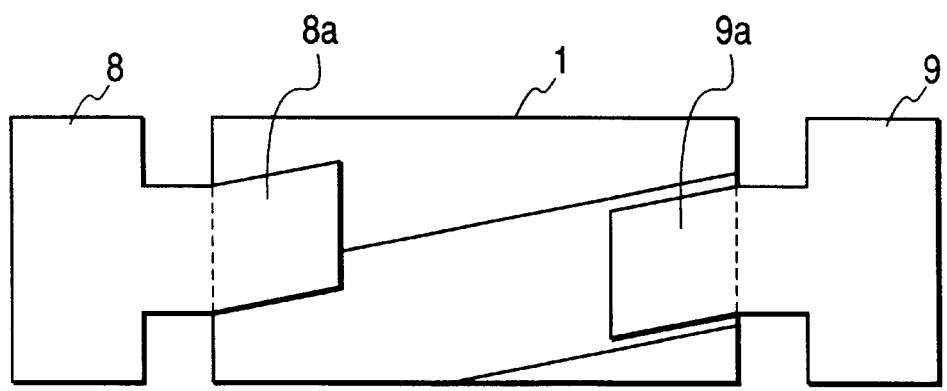
FIG. 21 shows the relation between the spiral outer yoke shown in FIG. 20 and a rotor.

FIG. 20 shows the outer yokes of the motor of FIG. 18 in a spiral shape, and the second outer yoke 9, as compared with the outer yoke of FIG. 18, has its teeth 9a, 9b formed in a spiral shape parallel to the spiral magnetization shape of the magnet ring 1. The first outer yoke 8 is also similar to the second outer yoke (the first outer yoke is not shown). Referring to FIG. 21 which is a plan view showing the relations among the first outer yoke 8, the second outer yoke 9 and the magnet ring 1, the tooth 8a and unshown tooth 8b of the first outer yoke 8, and the tooth 9a and unshown tooth 9b of the second outer yoke 9 are of a spiral shape parallel to the magnetization shape of the magnet ring 1. According to this, the relation between the magnet ring 1 and the teeth 8a, 8b of the first outer yoke 8 and the relation between the magnet ring 1 and the teeth 9a, 9b of the second outer yoke 9 deviate from each other by just 45°, and still rotation is obtained.

Figure 22:
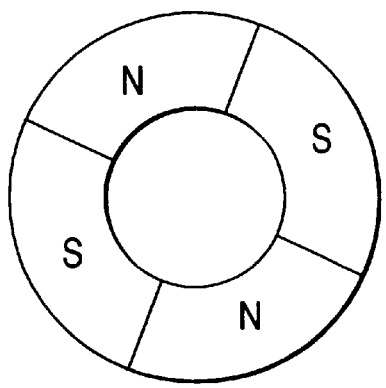
FIG. 22 shows that the magnetization of the rotor in each embodiment is limited to the outer peripheral surface thereof.
Figure 23:
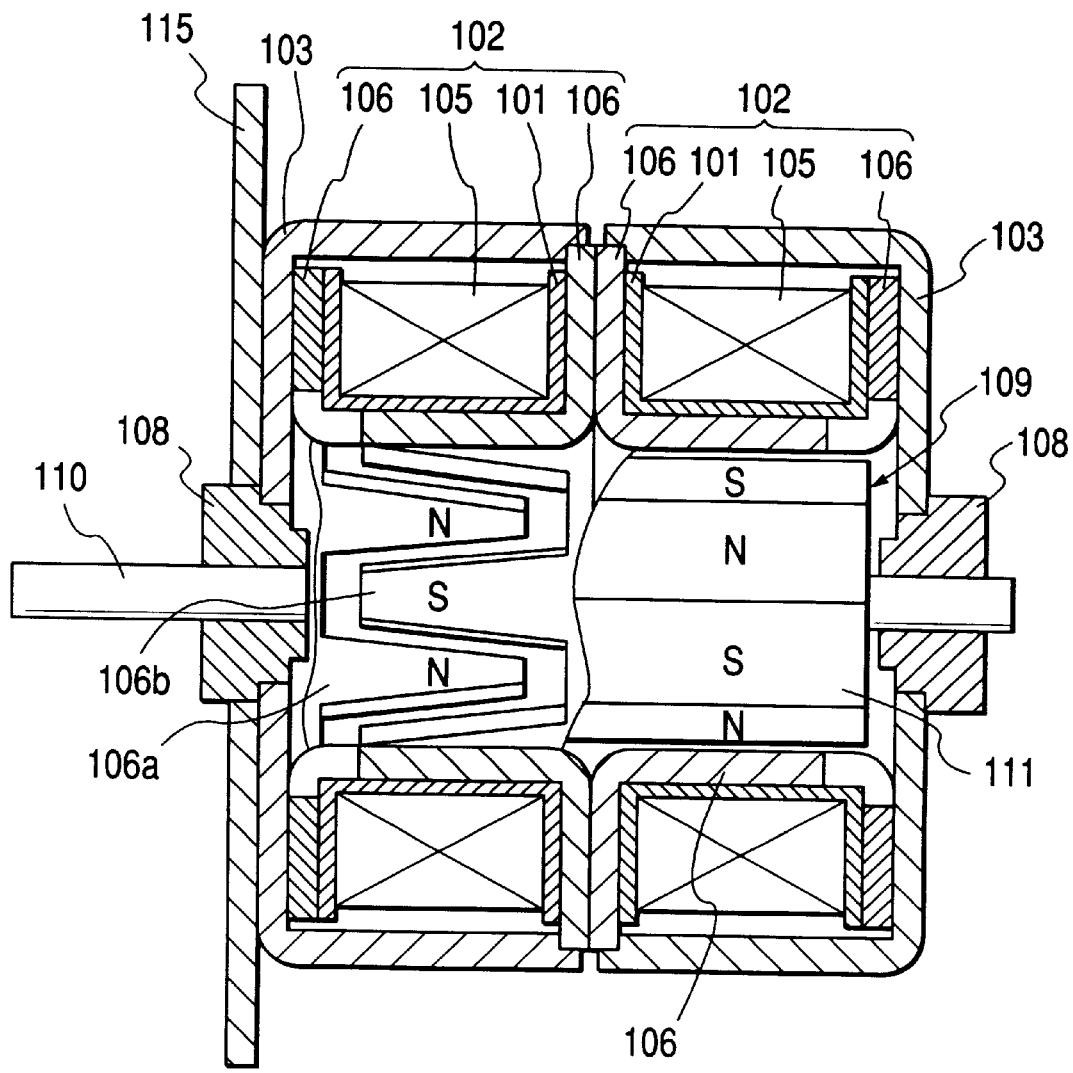
FIG. 23 is a cross-sectional view showing a step motor according to the prior art.
Figure 24:
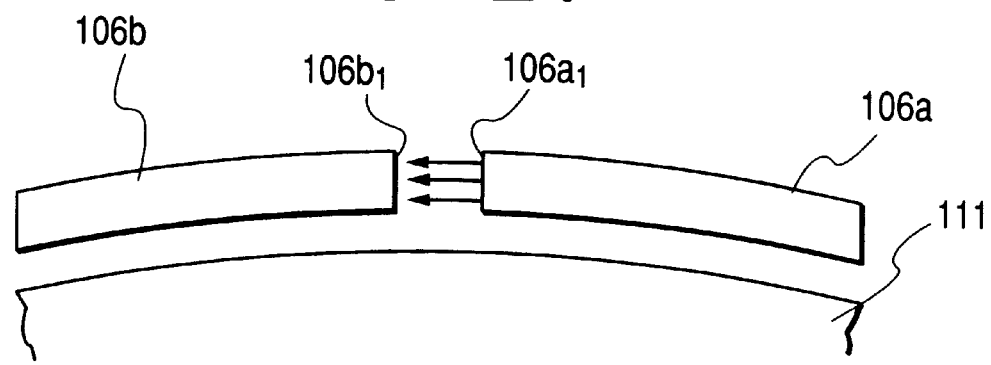
FIG. 24 is an illustration of the magnetic flux of the step motor according to the prior art shown in FIG. 23.

In each of the above-described embodiments, the permanent magnet constituting the rotor has its outer peripheral surface circumferentially divided into n and magnetized to the S poles and the N poles, and has its inner peripheral surface also circumferentially divided into n and magnetized to the S poles and the N poles, and the inner peripheral surface is magnetized to poles differing from those on the outer peripheral surface adjacent thereto, whereas the present invention is not restricted thereto, but the permanent magnet, as shown in FIG. 22, may have only its outer peripheral surface circumferentially divided into n and magnetized to the S poles and the N poles.

Further, in the above described embodiments, the number of the magnetized poles of the permanent magnet is four, whereas the present invention is not restricted thereto, but the number of the magnetized poles of the permanent magnet may be greater than four, and when the number of the magnetized poles of the permanent magnet is greater than four, the number of the outer magnetic poles and of the inner magnetic poles is correspondingly increased.

What is claimed is:

1. A motor including:
    a magnet formed into a cylindrical shape and having at least an outer peripheral surface circumferentially divided into a number of alternately magnetized different poles;
    a first coil and a second coil provided axially of said magnet, said first coil and said second coil passing through said magnet;
    a first outer magnetic pole excited by said first coil, said first outer magnetic pole being formed by cutting out said cylindrical shape and opposed to the outer peripheral surface of said one end side of said magnet;
    a first inner magnetic pole excited by said first coil, said first inner magnetic pole being opposed to an inner peripheral surface of on e end side of said magnet;
    a second outer magnetic pole excited by said second coil, said second outer magnetic pole being formed by cutting out said cylindrical shape and opposed to the outer peripheral surface of another end side of said magnet;
    a second inner magnetic pole excited by said second coil, said second inner magnetic pole being opposed to an inner peripheral surface of another end of said magnet; and
    power transmitting means formed on the outer peripheral surface of said magnet, a drive force from said power transmitting means being taken out through a cut out.

2. A motor according to claim 1, wherein said magnet has a first and second magnetized layers, each layer having at least its outer peripheral surface circumferentially divided into a number of alternately magnetized different poles, the number of alternately magnetized different poles of said second layer having a deviation of phase of 180/n degrees with respect to the first magnetized layer at an axially adjacent position, and wherein said power transmitting means is formed between the first magnetized layer and the second magnetized layer.

3. A motor according to claim 1, wherein said magnet has an inner peripheral surface circumferentially divided into a number of alternately magnetized different poles differing from a number of alternately magnetized different poles on an adjacent outer peripheral surface thereof.

4. A motor according to claim 1, wherein said first inner magnetic pole is formed as a first yoke, wherein said second inner magnetic pole is formed as a second yoke, and wherein said first outer magnetic pole and said second outer magnetic pole together form a third yoke.

5. A motor including:
    a magnet formed into a cylindrical shape and having at least an outer peripheral surface circumferentially divided into a number of alternately magnetized different poles;
    a first coil and a second coil provided axially of said magnet, said first coil and said second coil passing through said magnet;
    a first outer magnetic pole excited by said first coil, said first outer magnetic pole being formed by cutting out said cylindrical shape and opposed to the outer peripheral surface of one end side of said magnet;
    a first inner magnetic pole excited by said first coil, said first inner magnetic pole being opposed to an inner peripheral surface of said one end side of said magnet;
    a second outer magnetic pole excited by said second coil, said second outer magnetic pole being formed by cutting out said cylindrical shape and opposed to an outer peripheral surface of another end side of said magnet;
    a second inner magnetic pole excited by said second coil, said second inner magnetic pole being opposed to an inner peripheral surface of the other end of said magnet; and
    power transmitting means formed on the outer peripheral surface of said magnet, a drive force from said power transmitting means being taken out through said cut out, wherein said first inner magnetic pole is formed as a first yoke, said second inner magnetic pole is formed as a second yoke, and said first outer magnetic pole and said second outer magnetic pole together form a third yoke,
    wherein said third yoke has a cut-away aperture forming an outer magnetic pole, said power transmitting means is a gear, and a rotatively driving force of said gear is taken out to an outside thorough said cut-away aperture.

6. A motor according to claim 1, wherein said first inner magnetic pole is formed as a first yoke, said second inner magnetic pole is formed as a second yoke, said first outer magnetic pole is formed as a third yoke, said second outer magnetic pole is formed as a fourth yoke, said first yoke and said third yoke together form a first stator, said second yoke and said fourth yoke together form a second stator, and said third yoke and said fourth yoke are connected together by a cylindrically shaped connecting member.

7. A motor according to claim 6, wherein said connecting member has a hole as said cut out, said power transmitting means is a gear, and a rotatively driving force of said gear is taken out to an outside through said hole.

8. A motor including:
a magnet formed into a cylindrical shape and having at least an outer peripheral surface circumferentially divided into a number of alternately magnetized different poles;
power transmitting means integrally formed on the outer peripheral surface of an axially substantially central portion of said magnet;
a first coil and a second coil provided axially of said magnet; said first coil and said second coil passing through said magnet;
a cylindrical first yoke inserted in an inner diametral portion of said first coil and disposed so as to be opposed to inner diametral portions of said magnet with a first gap therebetween,
a cylindrical second yoke inserted in an inner diametral portion of said second coil and disposed so as to be opposed to inner diametral portion of said magnet with a second gap therebetween; and
a third yoke covering said first coil, said second coil and an outer diametral portion said magnet, said third yoke having a cut-away aperture, a drive force of said power transmitting means being taken out to an outside through said cut-away aperture.

9. A motor according to claim 8, wherein said power transmitting means is a gear, and said gear meshes with an outside gear through said cut-away aperture.

10. A motor according to claim 8, wherein magnetization shape of the number of alternately magnetized different poles is such a spiral shape that deviates by 180/n degrees from one end surface to another end surface of said cylindrical shape.

11. A motor including:
a magnet formed into a cylindrical shape and having at least an outer peripheral surface circumferentially divided into a number of alternately magnetized different poles;
power transmitting means integrally forced on an outer peripheral surface of an axially substantially central portion of said magnet;
a first coil and a second coil provided axially of said magnet, said first coil and said second coil passing through said magnet;
a cylindrical first yoke inserted in an inner diametral portion of said first coil and disposed so as to be opposed to an inner diametral portion of said magnet with a first gap therebetween;
a cylindrical second yoke inserted in an inner diametral portion of said second coil and disposed so as to be opposed to the inner diametral portion of said magnet with a second gap therebetween;
a third yoke having one end thereof connected to said first yoke and covering an outer diametral portion of said first coil, and having another end thereof opposed to an outer diametral portion of said magnet with a third gap therebetween;
a fourth yoke having one end thereof connected to said second yoke and covering an outer diametral portion of said second coil, and having another end thereof opposed to an outer diametral portion of said magnet with a fourth gap therebetween; and
a connecting member for holding said third yoke and said fourth yoke, said connecting member having a hole, a drive force of said power transmitting means being taken out to an outside through said hole.

12. A motor according to claim 11, wherein said power transmitting means is a gear, and said gear meshes with an outside gear through said hole.

13. A motor according to claim 11, wherein the magnetization shape of the number of alternately magnetized different poles is such a spiral shape that deviates by 180/n degrees from one end to another end surface of said cylindrical shape.

14. A motor according to claim 13, wherein said third yoke or said fourth yoke are spiral-shaped in parallel to a magnetization shape of said magnet.

15. A motor including:
a magnet formed into a cylindrical shape and having at least an outer peripheral surface circumferentially divided into a number of alternately magnetized different poles, said magnet having at least said outer peripheral surface circumferentially divided into a number of alternately magnetized different poles, and a magnetization shape thereof being such a spiral shape that deviates by 180/n degrees from one end surface to another end surface of said cylindrical shape;
power transmitting means formed on the outer peripheral surface of said magnet;
a first coil and a second coil provided axially of said magnet, said first coil and said second coil passing through said magnet;
a cylindrical first yoke inserted in an inner diametral portion of said first coil and disposed so as to be opposed to an inner diametral portion of said magnet with a first gap therebetween;
a cylindrical second yoke inserted in an inner diametral portion of said second coil and disposed so as to be opposed to an inner diametral portio of said magnet with a second gap therebetween; and
a third yoke covering said first coil, said second coil and an outer diametral portion of said magnet, said third yoke having a cut-away aperture, a drive force of said power transmitting means being taken out to an outside through said cut-away aperture.

16. A motor including:
a magnet formed into a cylindrical shape and having at least an outer peripheral surface circumferentially divided into a number of alternately magnetized different poles, said magnet having at least said outer peripheral surface circumferentially divided into a number of alternately magnetized different poles, and a magnetization shape thereof being such a spiral shape that deviates by 180/n degrees from one end surface to another end surface of said cylindrical shape;
power transmitting means formed on the outer peripheral surface of said magnet;
a first coil and a second coil provided coaxially of said magnet, said first coil and said second coil passing through said magnet;
a cylindrical first yoke inserted in an inner diametral portion of said first coil and disposed so as to be opposed to an inner diametral portion of said magnet with a first gap therebetween;
a cylindrical second yoke inserted in an inner diametral potion of said second coil and disposed so as to be opposed to an inner diametral portion of said magnet with a second gap therebetween;

a third yoke having one end thereof connected to said first yoke and covering an outer diametral portion of said first coil, and having another end thereof opposed to an outer diametral portion of said magnet with a third gap therebetween;

a fourth yoke having one end thereof connected to said second yoke and covering an outer diametral portion of said second coil, and having another end thereof opposed to an outer diametral portion of said magnet with a fourth gap therebetween; and a connecting member for holding said third yoke and said fourth yoke, said connecting member having a hole, a drive force of said power transmitting means being taken out to a outside through said hole.

* * * * *

UNITED STATES PATENT AND TRADEMARK OFFICE
CERTIFICATE OF CORRECTION

PATENT NO. : 5,973,425

DATED : October 26, 1999

INVENTOR(S) : Chikara AOSHIMA

Page 1 of 3

It is certified that error appears in the above-identified patent and that said Letters Patent is hereby corrected as shown below:

ON THE COVER PAGE

AT [56], References Cited, Foreign Patent Documents
"09289767 11/1997 Japan." should read --9-289,767 11/1997 Japan.--.

COLUMN 3:

Line 21, "positions" should read --portions--.
Line 24, "posi-" should read --por- --.

COLUMN 5:

Line 43, "li" should read --1i--.
Line 60, "portions" should read --portions,--.
Line 61, "positions," should read --positions--.

COLUMN 6:

Line 19, "li" should read --1i--.
Line 46, "porion" should read --portion--.

UNITED STATES PATENT AND TRADEMARK OFFICE
CERTIFICATE OF CORRECTION

PATENT NO. : 5,973,425

DATED : October 26, 1999

INVENTOR(S) : Chikara AOSHIMA

Page 2 of 3

It is certified that error appears in the above-identified patent and that said Letters Patent is hereby corrected as shown below:

COLUMN 7:

Line 20, "is" should be deleted.
Line 22, "layer" should read --layer,--.
Line 54, "li" should read --1i--.
Line 60, "li" should read --1i--.

COLUMN 8:

Line 47, "n." should read --n portions.--.
Line 63, "the" should read --are--

COLUMN 11:

Line 52, "on e" should read --one--.
Line 65, "a" should read --said--.
Line 67, "a" should be deleted.

COLUMN 12:

Line 30, "one" should read --said one--.
Line 33, "said one" should read --one--.
Line 41, "the other" should read --another--.
Line 55, "thorough" should read --through--.

UNITED STATES PATENT AND TRADEMARK OFFICE
CERTIFICATE OF CORRECTION

PATENT NO. : 5,973,425

DATED : October 26, 1999

INVENTOR(S) : Chikara AOSHIMA

It is certified that error appears in the above-identified patent and that said Letters Patent is hereby corrected as shown below:

COLUMN 13:

Line 23, "portion" should read --portion of--.
Line 41, "forced" should read --formed--.

COLUMN 14:

Line 36, "portio" should read --portion--.

COLUMN 16:

Line 6, "a" should read --an--.

Signed and Sealed this

Twelfth Day of September, 2000

Attest:

Q. TODD DICKINSON

*Attesting Officer*    *Director of Patents and Trademarks*